UNITED STATES PATENT OFFICE.

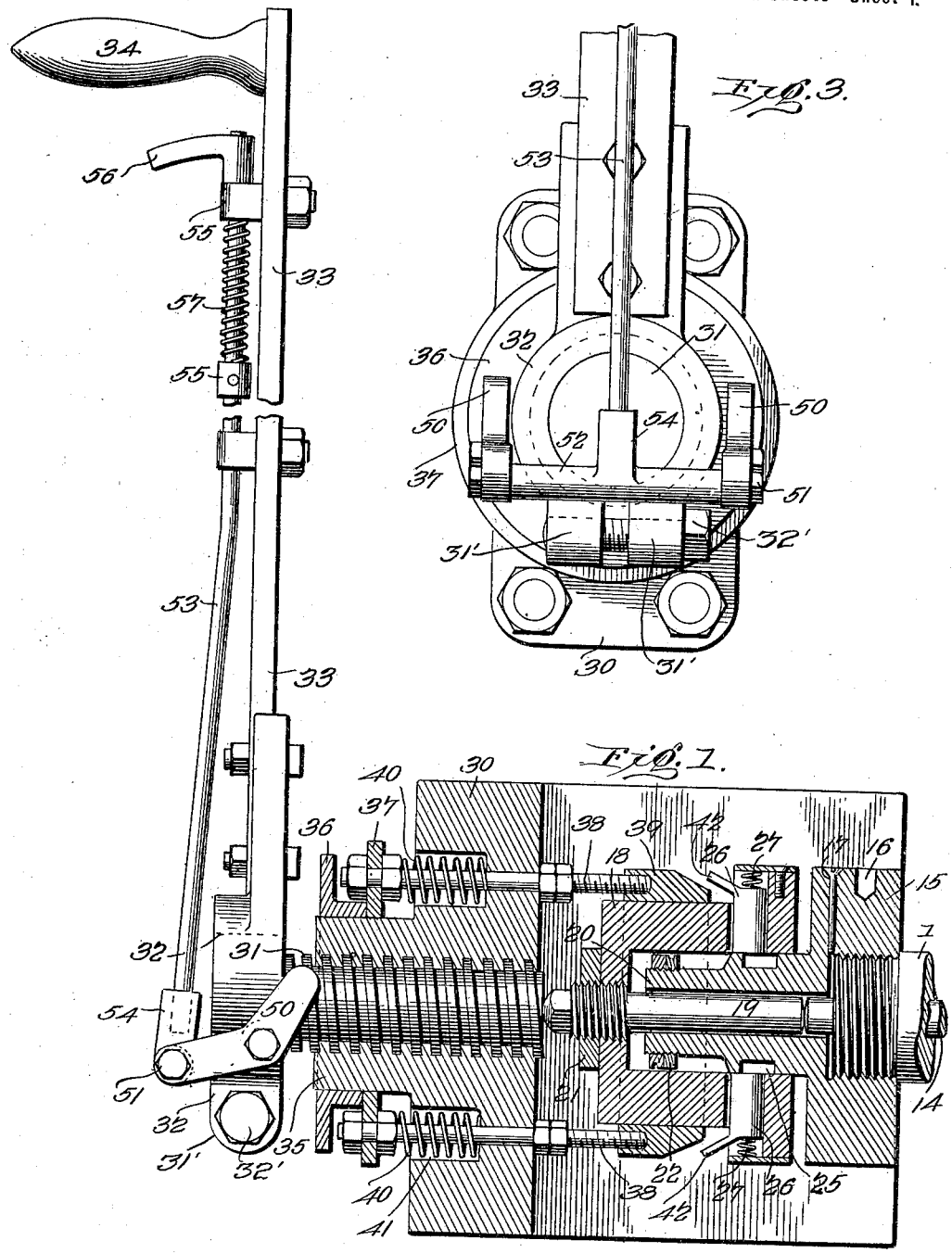

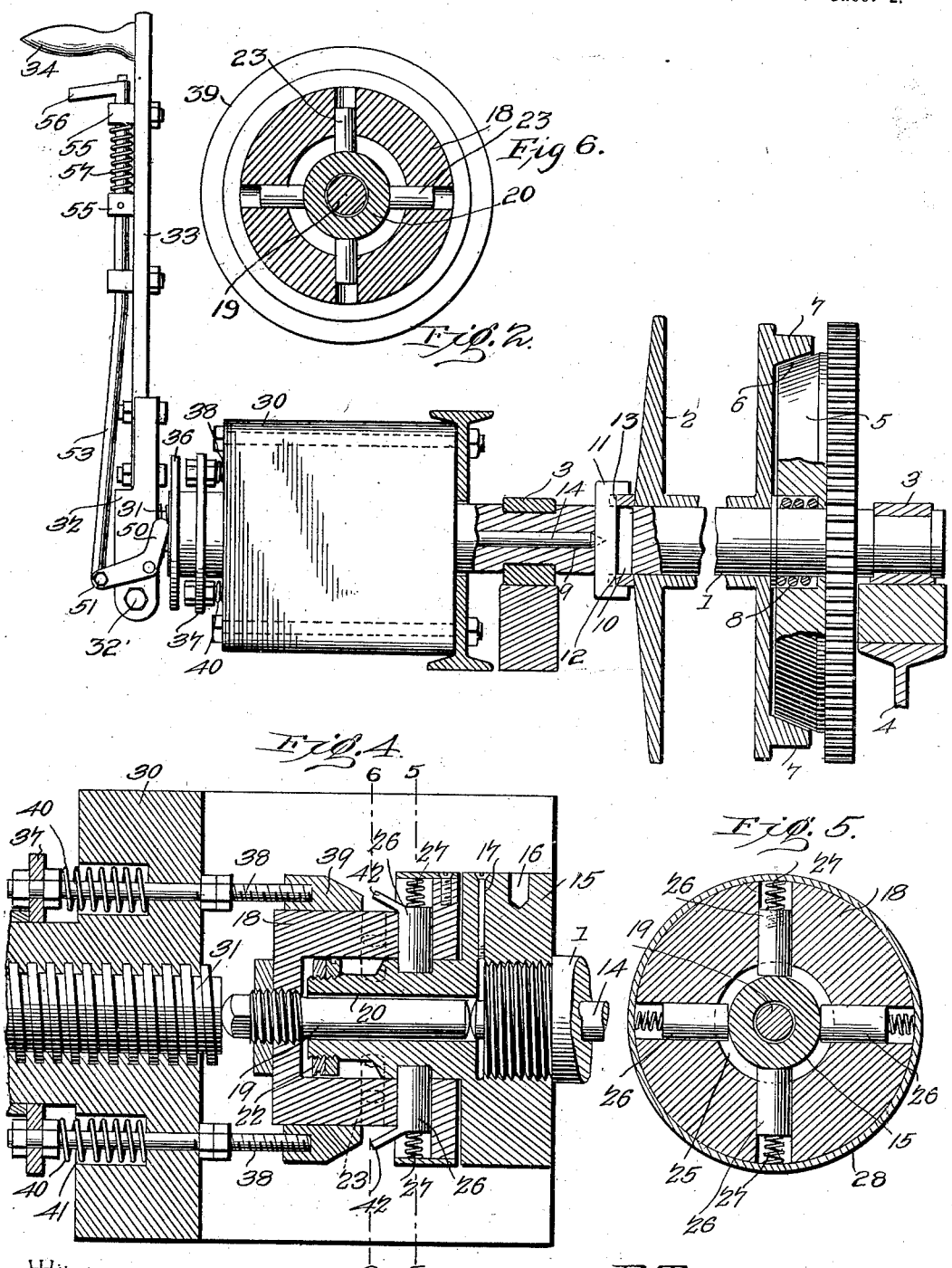

EDWARD TURNEY, OF PORTLAND, OREGON.

CLUTCH-OPERATING MECHANISM.

SPECIFICATION forming part of Letters Patent No. 709,567, dated September 23, 1902.

Application filed November 25, 1901. Serial No. 83,615. (No model.)

*To all whom it may concern:*

Be it known that I, EDWARD TURNEY, a citizen of the United States, residing at Portland, in the county of Multnomah and State of Oregon, have invented a new and useful Clutch-Operating Mechanism, of which the following is a specification.

My invention relates to certain improvements in mechanism for adjusting friction-clutches to operative or inoperative positions, and while applicable to clutches of various type is designed more especially for use in connection with a friction-clutch of the character illustrated in Letters Patent of the United States No. 680,900, granted to me on August 20, 1901.

One of the principal objects of the invention is to avoid all friction between the rotating and the normally stationary portions of the clutch-operating mechanism and to place all the strain on the main shaft without, however, subjecting the shaft to any friction, the shaft turning as freely in its bearings when the friction-clutch is engaged as when it is free.

Further objects are to relieve the stress on the thrust or pressure screw immediately after the clutch has been engaged and to provide for the close adjustment of the parts, so that the clutch may be engaged or disengaged by a slight movement of the operating-lever.

With these and other objects in view the invention consists in the novel construction and arrangement of parts hereinafter described, illustrated in the accompanying drawings, and particularly pointed out in the appended claims.

In the drawings, Figure 1 is a sectional elevation of a clutch-operating mechanism constructed in accordance with my invention. Fig. 2 is an elevation of the same, drawn to a somewhat-smaller scale, illustrating the application of the mechanism to one type of friction-clutch. Fig. 3 is an end elevation of a portion of the structure shown in Fig. 1. Fig. 4 is a sectional elevation of the device similar to Fig. 1, illustrating the parts in the position which they assume when the clutch is engaged. Fig. 5 is a transverse sectional elevation of the same on the line 5 5 of Fig. 4. Fig. 6 is a similar view on the line 6 6 of Fig. 4.

Similar numerals of reference are employed to designate corresponding parts throughout the several figures of the drawings.

Referring first to Fig. 2, 1 designates a shaft carrying a spool or winding-drum 2, said shaft being adapted to suitable bearings 3, carried by the frame or bed of the engine, a portion of which is indicated at 4. The shaft is provided near one end with a clutch-disk 5, having a laterally-projecting beveled flange or rim 6, and the spool or drum is provided with a flange 7, which is adapted to frictionally engage the flange or rim 6 when the spool or drum is moved outward against the tension of the coil compression-spring 8, and thereby lock the spool or drum to the shaft 1 and cause the same to rotate therewith.

The shaft 1 is provided with a longitudinal axial bore or passage 9 in its inner end and with a transverse or diametral slot 10, which communicates with the outer end of said bore. In the said slot 10 is fitted a jaw-shaped plate 11, which has a longitudinal movement in said slot and is provided at its extremities with jaws adapted to engage notched seats 12, formed in a sleeve or collar 13. The sleeve or collar 13 is loose on the shaft 1 and is adapted to move longitudinally on said shaft and to bear against the inner end of the drum or spool 2. In the bore 9 of shaft 1 is a longitudinally-movable pin 14, the outer end of which is preferably swiveled or otherwise suitably connected to the plate 11.

The mechanism thus far described is similar to that shown in the Letters Patent above referred to and does not form any part of the present invention, the structure being illustrated in order to show one application of the device which forms the subject of my present invention.

The end of the shaft 1 is threaded for the reception of a nut 15, having openings 16 for the reception of a spanner-wrench, by which the nut may be screwed into place, and in said nut is formed an opening 17, through which a suitable lubricant may be inserted for the end of the pin 14, a screw being inserted in the opening in order that a quantity of the lubricant may be retained within the revolving nut 15. On the outer end of the nut 15 is a cup-shaped collar 18, having a central opening threaded for the reception of the threaded end of a pin 19, which projects into a central opening 20 in the nut 15, and it is adapted to come into contact with the end of the pin 14. The outer end of the pin 19 is polygonal and adapted for the reception of a suitable wrench or other tool for screwing it into position or for adjusting purposes. The pin is locked in place by a lock-nut 21. The outer end of the nut 15 is threaded for the reception of nuts 22, adapted for contact with radial pins 23, carried by the collar 18 to limit the outward movement of said collar, said nuts being adjustable in order that the extent of movement may be governed in accordance with the distance traveled by the movable member of the clutch in disengaging. In the nut 15 there is formed an annular groove 25, adapted to receive radial locking-pins 26, guided in suitable openings in the collar 18 and adapted to be moved into locking engagement with the groove by small compression-springs 27, extending between the outer recessed ends of said pins and a ring 28, secured to the periphery of the collar 18.

Secured to the fixed base or frame of the engine is a nut 30, adapted for the reception of a thrust-screw 31, the inner end of which is adapted to be moved into contact with the end of the pin 19 and when so moved forcing the radial pins 26 into alinement with the groove 25 and locking the collar 18 to the nut 15. To the outer end of the screw 31 is secured the clamping yoke or collar 32 of an operating-lever 33, provided at its outer end with an operating-handle 34, by which it may be turned to effect the engagement or disengagement of the clutch. The clamping yoke or collar 32 is split to form two lugs 31', which are clamped together on the end of the screw 31 by a clamping bolt or screw 32', as shown more clearly in Fig. 3. The nut 30 is provided with a cylindrical hub portion 35, on which are mounted two rings or collars 36 37, the latter being connected by two or more bolts 38 to a ring or collar 39, mounted on the collar 18. The bolts are provided with adjustable nuts for governing the effective movement in either direction, and normally the collar 39 and the ring 37 are held in the position illustrated by spiral springs 40, seated in recesses 41 in the nut 30. The inner end or edge of the ring 39 is tapered and acts upon an inclined finger 42, projecting from each of the locking-pins 26, so that when said ring is forced inwardly or toward the shaft 1 it will serve to withdraw the pins 26 from the locking-groove 25 and release the collar 18 from the nut.

On the opposite sides of the clamping yoke or collar 32 are pivoted cam-levers 50, the outer ends of which are connected by a bolt 51 and transverse collar 52 to a pull-rod 53, the lower end of which is screwed or otherwise secured in a central boss 54 on the collar and the upper end of said rod being adapted to guides 55 on one side of the operating-lever 33. The upper end of the rod is provided with a handle 56, which may be engaged by the operator and drawn upwardly to the main handle 34 against the stress of a spring 57, surrounding said rod. The cams 50 are adapted to operate on the outer face of the ring or collar 36 to effect an inward movement of the releasing-collar 39.

In operation, the clutch being disengaged and the parts in the position illustrated in Fig. 1, the handle 34 is grasped to turn the lever 33 and rotate the thrust-screw 31. The end of the screw 31 engages the end of the pin 19, thereby forcing the pin 14 longitudinally of the shaft and causing the engagement of the members of the clutch. At the same time the collar 18 is moved with the pin 19 until the locking-pins 26 are in alinement with the annular groove 25 of the nut 15. By this time the clutch members are engaged, and the pins enter the slots and hold the collar 18 and pin 19 against a movement in the reverse direction. The operating-lever may then be swung back to its initial position, removing the thrust-screw from frictional contact with the end of the pin 19. The collar 18 revolves with the nut 19 during all the time the clutch members are engaged, thereby avoiding any friction between the parts, while at the same time all the strain will be borne by the main shaft and its nut.

The position assumed by the parts when the clutch members are engaged is illustrated in Figs. 4 and 5, and to release the clutch the handle 56 is grasped and drawn toward the handle 34, forcing the cams 50 into operative contact with the face of the collar or rim 36. The operating-lever 33 is then turned and the thrust-screw is rotated in the same direction as before, but not to a similar extent. The inward movement of the collar 36 forces the collar 37 and the collar 39 in the direction of the shaft, causing the inclined face of the collar 39 to engage with and raise the fingers 42, removing the locking-pins 26 from the groove 25, whereupon the stress of the main clutch-spring will cause an outward movement of the pins 14 and 19 and the collar 18 to an extent sufficient to move the pins 26 from alinement with the groove 25. The return of the lever to its initial position permits the collar 18 to back up until the radial pins 23 come into contact with the nuts 22 on the outer end of the nut 15, at which time the clutch members will be disengaged.

It will be understood that the invention is applicable to clutching devices of any character, the type herein illustrated and described being merely for the purpose of illustrating the device in connection with one form of clutch.

It is obvious that many changes may be made in the form, proportions, size, and minor details of construction of the device without departing from the spirit or sacrificing any of the advantages of the invention.

Having thus described my invention, what I claim is—

1. The combination with a revoluble shaft, of a clutch having a movable member, a clutch-operating mechanism comprising an endwise-movable clutch-operating member carried by the shaft and operatively connected to the movable member of the clutch, a member affixed to and rotating with the shaft, a movable collar, means for moving the collar, mechanism for transmitting the movement of the collar to the clutch-operating member and means for locking the collar to the shaft member.

2. A clutch-operating mechanism comprising in combination, a revoluble shaft, a clutch having a movable member, a longitudinally-movable clutch-operating member carried by said shaft and operably connected to the movable member of the clutch, a nut secured to the shaft, a movable collar carried by the nut, a pin carried by the collar for engagement with the clutch-operating member, and mechanism for locking and unlocking the nut and collar, substantially as specified.

3. A clutch-operating mechanism comprising in combination, a revoluble shaft, a clutch having a movable member, a longitudinally-movable clutch-operating member carried by said shaft and operably connected to the movable member of the clutch, a nut secured to the end of the shaft, a collar mounted on the nut and adapted to be locked thereto, a pin carried by the collar for engagement with the clutch-operating member, and a thrust-screw adapted to engage with the collar-pin, substantially as specified.

4. A clutch-operating mechanism comprising in combination, a revoluble shaft, a clutch having a movable member, a longitudinally-movable clutch-operating member carried by said shaft and operably connected to the movable member of the clutch, a thrust-screw, mechanism for transmitting the movement of the screw to said clutch-operating member, and mechanism for locking said member in clutch-engaging position, said locking mechanism being independent of the screw, substantially as specified.

5. The combination of a revoluble shaft, a clutch having a movable member, a longitudinally-movable clutch-operating member carried by said shaft and operably connected to the movable member of the clutch, a nut secured to the end of the shaft and having a locking-groove, a collar carried by and movable on said nut, locking-pins carried by the collar for engagement in said groove, a pin carried by the collar and adapted for engagement with the clutch-operating member, mechanism for imparting longitudinal movement to said pin, and means for unlocking the nut and collar.

6. The combination of a revoluble shaft, a clutch having a movable member, a longitudinally-movable clutch-operating member carried by said shaft and operably connected to the movable member of the clutch, a nut secured to the end of the shaft and provided with an annular groove, a collar carried by the nut, radial pins adapted to guiding-openings in the collar, springs normally tending to move the pins into locking engagement in the groove, a pin adjustably secured to the collar and adapted to engage the clutch-operating member, means for effecting a longitudinal movement of said pins, and means for withdrawing the locking-pins from said annular groove, substantially as specified.

7. The combination of a revoluble shaft, a clutch having a movable member, a nut carried by the shaft and having an annular groove, adjustable nuts carried by said shaft-nut, a collar carried by said nut and adapted to be locked thereto, stops carried by the collar for engagement with said adjustable nuts, thereby to limit the longitudinal movement of the collar, an adjustable pin carried by said collar for engagement with the clutch-operating member, means for operatively connecting the clutch-operating member to the movable member of the clutch and means for effecting the longitudinal movement of said pin and collar, substantially as specified.

8. The combination of a revoluble shaft, a clutch having a movable member, a longitudinally-movable clutch-operating member carried by said shaft and operably connected to the movable member of the clutch, a nut secured to the shaft and having a locking-groove, a collar mounted on said nut, a pin carried by the collar for engagement with the clutch-operating member, a series of locking-pins carried by the collar and adapted to engage in the groove of the nut, each of said pins having a projected finger, and a movable collar or ring having an inclined face for engagement with said fingers, and means for moving said collar and ring, substantially as specified.

9. The combination of a revoluble shaft, a clutch having a movable member, a longitudinally-movable clutch-operating member carried by said shaft and operably connected to the movable member of the clutch, a nut having an annular locking-groove, a collar mounted on the nut, a series of locking-pins carried by said collar and adapted to enter said locking-groove, each of said pins being provided with a laterally-projected finger, a ring or collar having an inclined edge or face for engagement with said finger, means for moving said ring or collar into and out of engagement with the fingers, springs adapted to force the locking-pins into engagement with the locking-groove, an adjustable pin carried by the said collar for engagement with the clutch-operating member, and means for moving said pin and collar, substantially as specified.

10. The combination of a revoluble shaft, a clutch having a movable member, a longitudinally-movable clutch-operating member carried by said shaft and operably connected to the movable member of the clutch, a nut secured to the end of the shaft, and having a guiding-opening in alinement with said clutch-operating member, a pin adapted to said opening and to engage the clutch-operating member, means for imparting endwise movement to said pin, and means for effecting the locking of said pin to said nut.

11. The combination of a revoluble shaft, a clutch having a movable member, a longitudinally-movable clutch-operating member carried by said shaft and operably connected to the movable member of the clutch, a nut secured to the end of the shaft and having a guiding-opening in alinement with the clutch-operating member, a pin adapted to said opening and to engage the clutch-operating member, a thrust-screw for imparting endwise movement to the pin, and means independent of the thrust-screw for locking said pin in clutch-engaging position.

12. The combination of a revoluble shaft, a clutch having a movable member, a longitudinally-movable clutch-operating member carried by said shaft and operably connected to the movable member of the clutch, a nut secured to the end of the shaft and having a guiding-opening in alinement with the clutch-operating member, a collar mounted on the shaft, means for locking and unlocking said collar and nut, a threaded pin carried by the collar and adjustable therein, a locked nut for securing the pin in adjusted position, said pin being adapted to enter the guiding-opening of the nut and to engage the clutch-operating member, and a thrust-screw for imparting endwise movement to said pin, substantially as specified.

13. The combination of a revoluble shaft, a clutch having a movable member, a longitudinally-movable clutch-operating member carried by said shaft and operably connected to the movable member of the clutch, a nut secured to the shaft and having an annular groove, a collar mounted on the nut, pins carried by said collar for engagement in the groove, each of said pins having a laterally-projected finger, a pin carried by the collar for engagement with the clutch-operating member, a thrust-screw, a stationary nut in which said thrust-screw is mounted, an operating-lever secured to said thrust-screw, a ring mounted on a boss forming part of said stationary nut, a ring or collar for engagement with the fingers of the locking-pins, and cams carried by said levers and movable into engagement with the ring carried by the nut, substantially as specified.

14. In a clutch-operating mechanism of the character described, the combination of the shaft, a clutch having a movable member, a nut carried by said shaft, a collar mounted on the nut, locking-pins carried by said collar, a ring mounted on said collar and adapted to engage with and unlock said pins, a stationary nut having a central boss, rings mounted on said boss and connected to the pin-engaging rings, a thrust-screw mounted in the stationary nut, mechanism for transmitting the endwise movement of the screw to the clutch-operating mechanism, and to the movable member of the clutch, an operating-lever secured to the screw, cam-levers pivoted to said operating-lever and adapted to engage the ring carried by the boss, and a handled rod connected to said levers, substantially as specified.

In testimony that I claim the foregoing as my own I have hereto affixed my signature in the presence of two witnesses.

EDWARD TURNEY.

Witnesses:
H. H. NEWHALL,
H. TURNEY.